(12) United States Patent
Pibre et al.

(10) Patent No.: US 12,017,480 B2
(45) Date of Patent: Jun. 25, 2024

(54) TIRE HAVING A COMPOSITION COMPRISING AN ETHYLENE-RICH ELASTOMER, A PEROXIDE AND A SPECIFIC ACRYLATE DERIVATIVE

(71) Applicant: COMPAGNIE GENERALE DES ETABLISSEMENTS MICHELIN, Clermont-Ferrand (FR)

(72) Inventors: Guillaume Pibre, Clermont-Ferrand (FR); Andrea Messina, Clermont-Ferrand (FR); Benjamin Gornard, Clermont-Ferrand (FR)

(73) Assignee: COMPAGNIE GENERALE DES ETABLISSEMENTS MICHELIN, Ferrand (FR)

( * ) Notice: Subject to any disclaimer, the term of this patent is extended or adjusted under 35 U.S.C. 154(b) by 573 days.

(21) Appl. No.: 17/270,786

(22) PCT Filed: Aug. 13, 2019

(86) PCT No.: PCT/EP2019/071646
§ 371 (c)(1),
(2) Date: Feb. 23, 2021

(87) PCT Pub. No.: WO2020/038762
PCT Pub. Date: Feb. 27, 2020

(65) Prior Publication Data
US 2021/0347205 A1    Nov. 11, 2021

(30) Foreign Application Priority Data
Aug. 23, 2018  (FR) .................................... 1857605

(51) Int. Cl.
| | |
|---|---|
| *B60C 1/00* | (2006.01) |
| *C08F 222/10* | (2006.01) |
| *C08K 3/04* | (2006.01) |
| *C08K 3/36* | (2006.01) |
| *C08K 5/14* | (2006.01) |
| *C08L 23/08* | (2006.01) |

(52) U.S. Cl.
CPC .......... *B60C 1/0016* (2013.01); *B60C 1/0041* (2013.01); *C08F 222/105* (2020.02); *C08K 3/04* (2013.01); *C08K 3/36* (2013.01); *C08K 5/14* (2013.01); *C08L 23/083* (2013.01)

(58) Field of Classification Search
CPC combination set(s) only.
See application file for complete search history.

(56) References Cited

U.S. PATENT DOCUMENTS

| | | |
|---|---|---|
| 5,227,425 A | 7/1993 | Rauline |
| 5,852,099 A | 12/1998 | Vanel |
| 5,900,449 A | 5/1999 | Custodero et al. |
| 6,300,407 B1 | 10/2001 | Machleder et al. |
| 6,310,164 B1 | 10/2001 | Morizono et al. |
| 6,420,488 B1 | 7/2002 | Penot |
| 6,536,492 B2 | 3/2003 | Vasseur |
| 6,569,799 B1 | 5/2003 | Barbotin et al. |
| 6,610,261 B1 | 8/2003 | Custodero et al. |
| 6,747,087 B2 | 6/2004 | Custodero et al. |
| 6,800,705 B2 | 10/2004 | Barbotin et al. |
| 6,975,396 B2 | 12/2005 | Custodero et al. |
| 7,094,854 B2 | 8/2006 | Monteil et al. |
| 7,135,517 B2 | 11/2006 | Simonot et al. |
| 7,199,175 B2 | 4/2007 | Vasseur |
| 7,202,295 B2 | 4/2007 | Simonot et al. |
| 7,250,463 B2 | 7/2007 | Durel et al. |
| 7,256,233 B2 | 8/2007 | Simonot et al. |
| 7,425,313 B2 | 9/2008 | Custodero et al. |
| 7,547,654 B2 | 6/2009 | Boisson et al. |
| 7,820,771 B2 | 10/2010 | Lapra et al. |
| 7,900,667 B2 | 3/2011 | Vasseur |
| 8,039,565 B2 | 10/2011 | Boisson et al. |
| 8,071,700 B2 | 12/2011 | Thuilliez et al. |
| 8,071,800 B2 | 12/2011 | Thuilliez et al. |
| 8,268,949 B2 | 9/2012 | Thuilliez et al. |
| 8,461,269 B2 | 6/2013 | Varagniat et al. |
| 8,492,573 B2 | 7/2013 | Thuilliez et al. |
| 8,883,929 B2 | 11/2014 | Gandon-Pain et al. |
| 9,718,309 B2 | 8/2017 | Vasseur et al. |
| 10,125,223 B2 | 11/2018 | Ciceron et al. |
| 10,301,455 B2 | 5/2019 | Vasseur |
| 10,355,215 B2 | 7/2019 | Nakayama et al. |
| 10,457,793 B2 | 10/2019 | Nayrat |
| 10,822,475 B2 | 11/2020 | Thuilliez et al. |

(Continued)

FOREIGN PATENT DOCUMENTS

| | | |
|---|---|---|
| CA | 2288384 A1 | 5/2000 |
| CN | 107880332 A | 4/2018 |

(Continued)

OTHER PUBLICATIONS

International Search Report dated Sep. 30, 2019, in corresponding PCT/EP2019/071646 (5 pages).
Thomas Scientific, London, GB, vol. 2018, No. 31, AN 2018-280054, XP002791330 (2 pages).
S. Brunauer, et al., "Adsorption of Gases in Multimolecular Layers", J. Am. Chem. Soc., vol. 60, pp. 309-319 (1938).
M. F. Llauro, et al., "Investigation of Ethylene/Butadiene Copolymers Microstructure by 1H and 13C NMR", Macromolecules 2001, 34, 6304-6311.
P. Glockner, et al., Radiation Curing—Coatings and Printing Inks—Technical Basics, Applications and Trouble Shooting, ISBN 978-3-86630-907-4, Vincentz Network, Hannover, Germany, 2008, pp. 60-69.

*Primary Examiner* — Peter A Salamon
(74) *Attorney, Agent, or Firm* — VENABLE LLP

(57) ABSTRACT

A tire comprises a rubber composition based on at least one elastomeric matrix mainly comprising a random copolymer comprising ethylene units and conjugated diene units, the mole fraction of the ethylene units in the copolymer being within a range extending from 50% to 95%; a peroxide; and a specific polyfunctional acrylate derivative.

16 Claims, No Drawings

(56) References Cited

U.S. PATENT DOCUMENTS

| | | |
|---|---|---|
| 10,844,149 B2 | 11/2020 | Pacheco et al. |
| 11,241,370 B2 | 2/2022 | Valero et al. |
| 11,254,804 B2 | 2/2022 | Gornard et al. |
| 11,286,369 B2 | 3/2022 | Gomard et al. |
| 2001/0034389 A1 | 10/2001 | Vasseur |
| 2002/0004549 A1 | 1/2002 | Custodero et al. |
| 2003/0004287 A1 | 1/2003 | Barbotin et al. |
| 2003/0202923 A1 | 10/2003 | Custodero et al. |
| 2003/0212185 A1 | 11/2003 | Vasseur |
| 2004/0030017 A1 | 2/2004 | Simonot et al. |
| 2005/0004297 A1 | 1/2005 | Durel et al. |
| 2005/0032965 A1 | 2/2005 | Valero |
| 2005/0171264 A1 | 8/2005 | Simonot et al. |
| 2005/0239639 A1 | 10/2005 | Monteil et al. |
| 2005/0267242 A1 | 12/2005 | Custodero et al. |
| 2005/0287300 A1 | 12/2005 | Herrwerth et al. |
| 2006/0009564 A1 | 1/2006 | Simonot et al. |
| 2006/0160969 A1 | 7/2006 | Boisson et al. |
| 2007/0112120 A1 | 5/2007 | Vasseur |
| 2008/0132644 A1 | 6/2008 | Lapra et al. |
| 2009/0182104 A1 | 7/2009 | Thuilliez et al. |
| 2009/0270558 A1 | 10/2009 | Gandon-pain et al. |
| 2009/0270578 A1 | 10/2009 | Boisson et al. |
| 2010/0022714 A1 | 1/2010 | Varagniat et al. |
| 2010/0022725 A1 | 1/2010 | Thuilliez et al. |
| 2010/0221541 A1 | 9/2010 | Valero et al. |
| 2011/0021702 A1 | 1/2011 | Gandon-Pain et al. |
| 2011/0263784 A1 | 10/2011 | Valero et al. |
| 2012/0142905 A1 | 6/2012 | Thuilliez et al. |
| 2012/0165492 A1 | 6/2012 | Thuilliez et al. |
| 2012/0208948 A1 | 8/2012 | Gandon-Pain et al. |
| 2013/0324660 A1* | 12/2013 | Matsushita ............... C08L 9/00 524/526 |
| 2014/0005321 A1* | 1/2014 | Horikawa ................ C08K 3/04 524/495 |
| 2016/0243896 A1* | 8/2016 | Vasseur .................... C08K 5/14 |
| 2017/0084840 A1 | 3/2017 | Nakayama et al. |
| 2017/0198097 A1 | 7/2017 | Ciceron et al. |
| 2017/0349728 A1* | 12/2017 | Nayrat ..................... C08K 3/04 |
| 2017/0349731 A1* | 12/2017 | Vasseur .................. C08K 13/02 |
| 2018/0022903 A1 | 1/2018 | Kotani |
| 2018/0371129 A1 | 12/2018 | Pacheco et al. |
| 2018/0371214 A1 | 12/2018 | Thuilliez et al. |
| 2019/0359799 A1 | 11/2019 | Fleury et al. |
| 2020/0339716 A1 | 10/2020 | Pacheco et al. |
| 2021/0332168 A1 | 10/2021 | Pibre et al. |
| 2021/0339566 A1 | 11/2021 | Pibre et al. |

FOREIGN PATENT DOCUMENTS

| | | |
|---|---|---|
| EP | 0501227 A1 | 9/1992 |
| EP | 0735088 A1 | 10/1996 |
| EP | 0810258 A1 | 12/1997 |
| EP | 1092731 A1 | 4/2001 |
| EP | 1554321 | 7/2005 |
| EP | 1595909 A1 | 11/2005 |
| EP | 1656400 | 5/2006 |
| EP | 1829901 A2 | 9/2007 |
| EP | 1954705 | 8/2008 |
| EP | 1957506 | 8/2008 |
| EP | 2671897 A1 | 12/2013 |
| FR | 2997409 A1 | 5/2014 |
| FR | 3012147 A1 | 4/2015 |
| FR | 3022544 A1 | 12/2015 |
| FR | 3030544 A1 | 6/2016 |
| FR | 3045612 A1 | 6/2017 |
| FR | 3045613 A1 | 6/2017 |
| JP | 11-80269 A | 3/1999 |
| JP | 11-293043 A | 10/1999 |
| JP | 2011-52089 A | 3/2011 |
| JP | 2014-28887 A | 2/2014 |
| JP | 2017-8244 A | 1/2017 |
| WO | 97/36724 A2 | 10/1997 |
| WO | 99/16600 A1 | 4/1999 |
| WO | 99/28376 A2 | 6/1999 |
| WO | 00/5300 A1 | 2/2000 |
| WO | 00/5301 A1 | 2/2000 |
| WO | 00/44734 A1 | 8/2000 |
| WO | 00/73372 A1 | 12/2000 |
| WO | 02/10269 A2 | 2/2002 |
| WO | 02/053634 A1 | 7/2002 |
| WO | 03/016215 A1 | 2/2003 |
| WO | 03/016387 A1 | 2/2003 |
| WO | 2004/003067 A1 | 1/2004 |
| WO | 2004/056915 A1 | 7/2004 |
| WO | 2006/069792 A1 | 7/2006 |
| WO | 2006/069793 A1 | 7/2006 |
| WO | 2007/054224 A2 | 5/2007 |
| WO | 2008/000696 A1 | 1/2008 |
| WO | 2008/003434 A1 | 1/2008 |
| WO | 2008/003435 A1 | 1/2008 |
| WO | 2012/093465 A1 | 7/2012 |
| WO | 2016/102480 A1 | 6/2016 |
| WO | 2016/102483 A1 | 6/2016 |
| WO | 2016/111230 A1 | 7/2016 |
| WO | 2016/009892 A1 | 4/2017 |
| WO | 2017/103543 A1 | 6/2017 |
| WO | 2018/109312 A1 | 6/2018 |
| WO | 2019/106292 A1 | 6/2019 |

* cited by examiner

TIRE HAVING A COMPOSITION COMPRISING AN ETHYLENE-RICH ELASTOMER, A PEROXIDE AND A SPECIFIC ACRYLATE DERIVATIVE

BACKGROUND

The invention relates to tyres and more particularly to those in which the composition of the tread or that of an inner layer comprises a polyfunctional acrylate derivative and a peroxide.

Tyre layers such as the tread or the inner layers must comply with a large number of technical, often antinomic, requirements including low rolling resistance, high wear resistance, good road behaviour, and also a good level of cohesion of the material.

Tyre designers are constantly looking for a solution to change the existing property compromise by improving at least one property of the tyre, without however penalizing others.

It is known that to improve wear resistance a certain stiffness of the tread is desirable, which stiffening of the tread may be obtained for example by increasing the content of reinforcing filler or by incorporating certain reinforcing resins into the rubber compositions making up these treads. Unfortunately, experience shows that such stiffening of the tread can decrease, in a known manner, the rolling resistance properties, accompanied by a significant increase in hysteretic losses of the rubber composition. Improving stiffness performance while maintaining low rolling resistance is therefore a problem to be solved for tyre designers.

From the point of view of the rolling resistance, the abovementioned compromise of properties could be improved thanks to the use of new mixtures having good mechanical properties and a hysteresis as low as possible in order to be able to use them in the form of rubber compositions that can be used for the manufacture of various semi-finished products used in the composition of tyres. For example, documents WO 2016/102480 and WO 2016/102483 propose to use a polyfunctional acrylate derivative and a peroxide in diene elastomer-based compositions.

Thus, manufacturers are always looking for solutions to further improve both stiffness and rolling resistance.

Continuing its research, the applicant has surprisingly discovered that the use of specific acrylate derivatives in a composition comprising a particular random copolymer comprising ethylene units and conjugated diene units makes it possible to improve the rolling resistance, the stiffness and the reinforcement of the composition.

SUMMARY

Thus, a subject of the present invention is in particular a tyre comprising a rubber composition based on:
- an elastomeric matrix comprising predominantly a random copolymer comprising ethylene units and conjugated diene units, the mole fraction of the ethylene units in the copolymer being within a range extending from 50% to 95%,
- at least one peroxide, and
- at least one polyfunctional acrylate derivative of formula (I)

$$[X]_p A \qquad (I)$$

in which:
- A represents a linear, branched or cyclic $C_4$-$C_{30}$ hydrocarbon group, interrupted and/or substituted by one or more heteroatoms,
- A comprising p free valences, p having a value ranging from 2 to 6,
- $[X]p$ corresponds to a radical of formula (II):

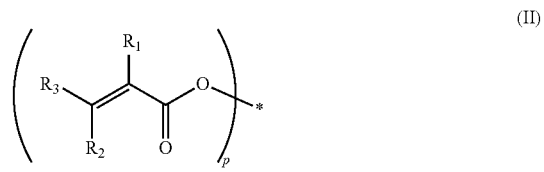

in which:
- $R_1$, $R_2$ and $R_3$ independently represent a hydrogen atom or a $C_1$-$C_8$ hydrocarbon group selected from the group consisting of linear, branched or cyclic alkyl groups, alkylaryl groups, aryl groups and aralkyls, and which are optionally interrupted by one or more heteroatoms, it being possible for $R_2$ and $R_3$ together to form a non-aromatic ring,
- (*) represents the point of attachment of the radical of formula (II) to A,
it being understood that the 2 to 6× radicals are identical or different.

DETAILED DESCRIPTION

I—DEFINITIONS

The expression "composition based on" should be understood as meaning a composition comprising the mixture and/or the product of the in situ reaction of the various constituents used, some of these constituents being able to react and/or being intended to react with one another, at least partially, during the various phases of manufacture of the composition; it thus being possible for the composition to be in the completely or partially crosslinked state or in the noncrosslinked state.

For the purposes of the present invention, the expression "part by weight per hundred parts by weight of elastomer" (or phr) should be understood as meaning the part by weight per hundred parts by weight of elastomer.

In the present document, unless expressly indicated otherwise, all the percentages (%) indicated are percentages (%) by weight.

Furthermore, any interval of values denoted by the expression "between a and b" represents the range of values extending from more than "a" to less than "b" (i.e. limits a and b excluded), while any interval of values denoted by the expression "from a to b" means the range of values extending from "a" up to "b" (i.e. including the strict limits a and b). In the present document, when an interval of values is described by the expression "from a to b", the interval represented by the expression "between a and b" is also and preferably described.

When reference is made to a "predominant" compound, this is understood to mean, for the purposes of the present invention, that this compound is predominant among the compounds of the same type in the composition, that is to say that it is the one which represents the greatest amount by weight among the compounds of the same type. Thus, for example, a predominant elastomer is the elastomer representing the greatest weight with respect to the total weight of the elastomers in the composition. In the same way, a "predominant" filler is that representing the greatest weight among the fillers of the composition. By way of example, in a system comprising just one elastomer, the latter is predominant for the purposes of the present invention and, in a system comprising two elastomers, the predominant elastomer represents more than half of the weight of the elastomers. Preferably, the term "predominant" is understood to mean present at more than 50%, preferably more than 60%, 70%, 80%, 90%, and more preferentially the "predominant" compound represents 100%.

The compounds comprising carbon mentioned in the description can be of fossil origin or biosourced. In the latter case, they can result, partially or completely, from biomass or be obtained from renewable starting materials resulting from biomass. Polymers, plasticizers, fillers, and the like, are concerned in particular.

II—Description of the Invention

II-1 Elastomeric Matrix

The composition of the tyre according to the invention has the essential characteristic of comprising an elastomeric matrix comprising predominantly a random copolymer comprising ethylene units and conjugated diene units (also referred to herein as "the copolymer"), the mole fraction of the ethylene units in the copolymer being within a range extending from 50% to 95%.

According to the invention, the conjugated diene units are preferably selected from the group consisting of butadiene units, isoprene units and mixtures of these conjugated diene units. More preferably, the conjugated diene units are predominantly, or even preferentially exclusively, butadiene units.

Advantageously, the microstructure of the copolymer is homogeneous. A copolymer is of homogeneous microstructure when, for each of these units, at each instant of polymerization, the concentrations in the chain are identical or virtually identical. Thus, for each of these units, at a given instant, the concentration is identical or virtually identical to its concentration at the instant just before and after, and thus at any instant of the polymerization. For the purposes of the present invention, in the expression "the concentration is identical or virtually identical to", the term "virtually identical" is intended to mean a variation of less than 2 mol %.

In particular, in the random copolymer comprising ethylene units and conjugated diene units, the molar concentration in each of these units is constant all along the copolymer chain. Thus, for a representative number of successive units defining a segment, present at the beginning, middle or end or at any other place of the chain of the copolymer, the concentration of ethylene units and conjugated diene units is identical or virtually identical in each segment. A sequence of 10 units may be a representative number.

Advantageously, the concentration of ethylene units and conjugated diene units (preferably butadiene units) is identical or virtually identical all along the copolymer chain. It will be possible to determine the concentration of each of the units in advance according to the nature of the catalytic system selected and to the operating conditions (monomer concentrations and pressure in particular).

Advantageously, the mole fraction of the ethylene units in the copolymer is within a range extending from 60% to 90%, preferably from 65% to 85%.

The mole fraction of conjugated diene units (preferably butadiene units) in the copolymer is less than or equal to 50%. Preferably, it is within a range extending from 5% to 50%, preferably from 10% to 40%, preferably from 15% to 35%.

According to the invention, the random copolymer comprising ethylene units and conjugated diene units may comprise trans-1,2-cyclohexane units. When the copolymer comprises trans-1,2-cyclohexane units, the mole fraction of trans-1,2-cyclohexane units in the copolymer is preferably between 0% and 25%, preferably from 1% to 10%, more preferably from 1% to 5%.

According to the invention, the random copolymer comprising ethylene units and conjugated diene units may comprise vinylaromatic units. By way of vinylaromatic unit, the following are suitable for example: styrene, ortho-, meta-, or para-methylstyrene, the commercially sold mixture "vinyl toluene", para-tert-butylstyrene, methoxystyrenes, chlorostyrenes, vinylmesitylene, divinylbenzene, vinylnaphthalene. Advantageously, the random copolymer comprising ethylene units and conjugated diene units does not comprise a vinylaromatic unit.

Advantageously, the random copolymer comprising ethylene units and conjugated diene units has a weight Mn ranging from 20000 g/mol to 1500000 g/mol, more preferentially ranging from 60 000 g/mol to 250000 g/mol.

Advantageously also, the random copolymer comprising ethylene units and conjugated diene units has a polydispersity index which is less than 2.5. Preferably, the PDI index of said copolymers is less than 2 and, even more preferentially, this PDI index is less than or equal to 1.9. As with the molecular weights Mn, the polydispersity indices PDI were determined in the present application by size exclusion chromatography.

Advantageously also, the random copolymer comprising ethylene units and conjugated diene units has a glass transition temperature Tg which is less than 25° C. More specifically, these copolymers may for example have a temperature Tg of between −45° C. and −20° C.

Advantageously also, when the random copolymer comprising ethylene units and conjugated diene units additionally comprises trans-1,2-cyclohexane units, the copolymer has a crystallinity of less than 25%, more advantageously less than 15%, and even more advantageously less than 10%.

The techniques used for the determination of the mole fractions, molecular weights, glass transition temperatures and crystallinity are described hereinafter in the examples.

The random copolymers comprising ethylene units and conjugated diene units that can be used in the context of the present invention may be obtained according to known synthesis methods, in particular those described in documents EP 1092731, EP 1554321, EP 1656400, EP 1829901, EP 1954705, EP 1957506, FR 3045612 or FR 3045613.

According to the invention, advantageously, the elastomeric matrix comprises only, as elastomer, the random copolymer comprising ethylene units and conjugated diene units.

Alternatively, the elastomeric matrix may also comprise a diene elastomer other than the random copolymer comprising ethylene units and conjugated diene units (also referred to herein as "the other elastomer"). The other elastomer, when it is present, is a minority, that is to say that it represents less than 50%, 40%, 30%, 20% or even less than 10% by weight of the elastomeric matrix.

The other elastomer of the elastomeric matrix of the tyre according to the invention is preferentially selected from the group of highly unsaturated diene elastomers consisting of polybutadienes (abbreviated to "BRs"), synthetic polyisoprenes (IRs), natural rubber (NR), butadiene copolymers, isoprene copolymers and mixtures of these elastomers. Such copolymers are more preferentially selected from the group consisting of butadiene/styrene copolymers (SBRs), isoprene/butadiene copolymers (BIRs), isoprene/styrene copolymers (SIRs), isoprene/butadiene/styrene copolymers (SBIRs), butadiene/acrylonitrile copolymers (NBRs), butadiene/styrene/acrylonitrile copolymers (NSBRs) or a mixture of two or more of these compounds.

II-2 Polyfunctional Acrylate

The tyre according to the invention comprises a composition which comprises at least one polyfunctional acrylate derivative of formula (I)

in which:
A represents a linear, branched or cyclic $C_4$-$C_{30}$ hydrocarbon group, interrupted and/or substituted by one or more heteroatoms,
A comprising p free valences, p having a value ranging from 2 to 6,
$[X]p$ corresponds to a radical of formula (II):

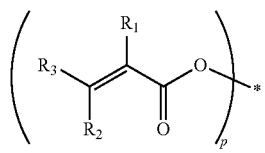

in which:
$R_1$, $R_2$ and $R_3$ independently represent a hydrogen atom or a $C_1$-$C_8$ hydrocarbon group selected from the group consisting of linear, branched or cyclic alkyl groups, alkylaryl groups, aryl groups and aralkyls, and which are optionally interrupted by one or more heteroatoms, it being possible for $R_2$ and $R_3$ together to form a non-aromatic ring,
(*) represents the point of attachment of the radical of formula (II) to A,
it being understood that the 2 to 6× radicals are identical or different.

Cyclic alkyl group is understood to mean an alkyl group comprising one or more rings.

Hydrocarbon group or chain interrupted by one or more heteroatoms is understood to mean a group or chain comprising one or more heteroatoms, each heteroatom being between two carbon atoms of said group or of said chain, or between a carbon atom of said group or of said chain and another heteroatom of said group or of said chain, or between two other heteroatoms of said group or of said chain.

Hydrocarbon group or chain substituted by one or more heteroatoms is understood to mean a group or chain comprising one or more heteroatoms, each heteroatom being bonded to the hydrocarbon group or chain by a covalent bond without interrupting the hydrocarbon group or chain.

The heteroatom(s) of the $R_1$, $R_2$ and $R_3$ radicals can be nitrogen, sulfur or oxygen atoms.

Preferentially, $R_1$, $R_2$ and $R_3$ independently represent a hydrogen atom, a methyl group or an ethyl group. More preferentially, $R_1$, $R_2$ and $R_3$ can each represent a hydrogen atom. Alternatively, $R_2$ and $R_3$ can each represent a hydrogen atom and $R_1$ represents a methyl group.

The valence number p depends on the nature of the radical A. According to the invention, p can be 2, 3, 4, 5 or 6. Preferably, P is 2, 3 or 4, preferably 2.

The heteroatom(s) of A can be selected from the group consisting of oxygen, sulfur, nitrogen, silicon and phosphorus atoms, and combinations thereof. Preferably, the heteroatom(s) of A are selected from the group consisting of oxygen and sulfur atoms. More preferably, the heteroatom(s) of A are oxygen atoms.

In other words, A advantageously represents a linear, branched or cyclic $C_4$-$C_{30}$ hydrocarbon group, interrupted and/or substituted by one or more heteroatoms selected from oxygen, sulfur, nitrogen, silicon and phosphorus atoms, and combinations thereof, preferably selected from the group consisting of oxygen and sulfur atoms. More preferably, A advantageously represents a linear, branched or cyclic, preferably linear or branched, $C_4$-$C_{30}$ hydrocarbon group, interrupted and/or substituted by one or more oxygen and/or sulfur atoms, preferably interrupted and/or substituted by one or more oxygen atoms.

Preferably, A represents a linear, branched or cyclic, preferably linear or branched, $C_4$-$C_{30}$ hydrocarbon group, interrupted by one or more oxygen and/or sulfur atoms, preferably interrupted by one or more oxygen atoms. More preferably, A represents a linear or branched $C_4$-$C_{30}$ hydrocarbon group, interrupted by one or more oxygen atoms.

When A represents a $C_4$-$C_{30}$ hydrocarbon group, it may for example be a $C_5$-$C_{20}$, preferably $C_6$-$C_{16}$, hydrocarbon group.

When A comprises a cyclic hydrocarbon group, it may be a non-aromatic or aromatic, preferably non-aromatic, cyclic hydrocarbon group.

Advantageously, A represents a radical of formula (III):

in which
Z comprising q free valences, q having a value ranging from 2 to 6,
$[Y]q$ corresponds to a radical of formula (IV):

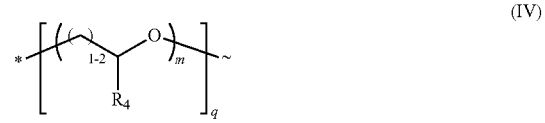

in which
R represents a hydrogen atom or a methyl group,
m is an integer ranging from 1 to 13, preferably from 2 to 6,
(*) represents the point of attachment of the radical of formula (IV) to the radical of formula (II),
(~) represents the point of attachment of the radical of formula (IV) to Z,
Z corresponds to a linear or branched $C_2$-$C_{20}$ hydrocarbon group, preferably Z corresponds to a radical in the group consisting of:

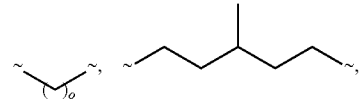

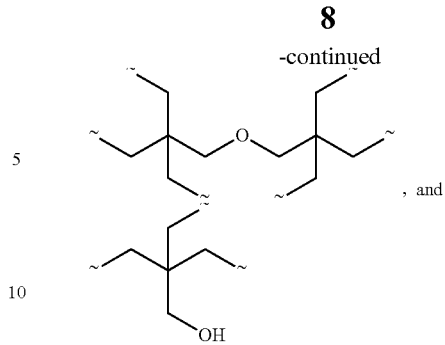

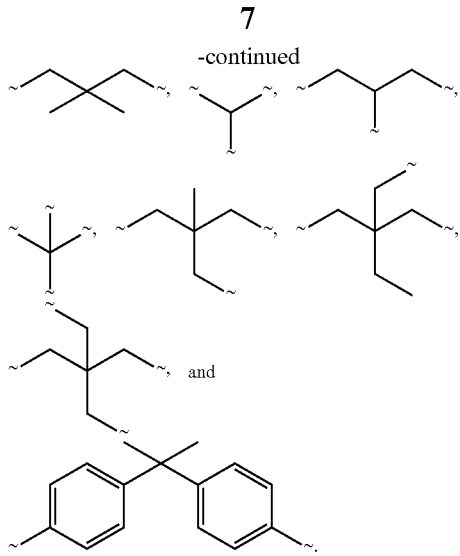

in which o is an integer ranging from 2 to 16, preferably from 4 to 10, and (~) represents the point of attachment of Z to the radical of formula (IV).

Those skilled in the art clearly understand that, when A represents a radical of formula (III), the valence number p of A is equal to the valence number q of Z.

By way of example of a polyfunctional acrylate derivative of formula (I) in which A represents a radical of formula (III), mention may be made of those from Sartomer under the name SR264 (polyethylene glycol (300) diacrylate), SR268G (tetraethylene glycol diacrylate), SR306 (tripropylene glycol diacrylate), SR349 (ethoxylated bisphenol A diacrylate (3)), SR508 (dipropylene glycol diacrylate), CD561 (ethoxylated hexanediol diacrylate (5)), SR9003 (propoxylated neopentyl glycol diacrylate (2)), SR454 (ethoxylated trimethylolpropane triacrylate (3)), SR492 (propoxylated trimethylolpropane triacrylate (3)), SR494 (ethoxylated pentaerythritol tetraacrylate (4)), SR9020 (propoxylated glyceryl triacrylate (3)), SR205 (triethylene glycol dimethacrylate), SR210 (polyethylene glycol dimethacrylate (200)), SR348 (ethoxylated bisphenol A dimethacrylate (3)), SR596 (alkoxylated pentaerythritol tetramethacrylate); those from Miwon Speciality Chemical under the name Miramer M202, M206, M210, M216, M220, M222, M232, M240, M244, M270, M280, M282, M284, M286, M290, M320, M360, M2040, M2100, M2300, M3130, M3150, M3160, M3190, LR3130, M4004, M233, M241, M245, M2101, M2301, M281, M283, M287; or else those from IGM Resins under the name Photomer 4028, 4050, 4054, 4056, 4062, 4070, 4127, 4226, 4361, 4362, 4072, 4094, 4149, 4158, 3005.

Alternatively, A can represent a radical selected from the group consisting of:

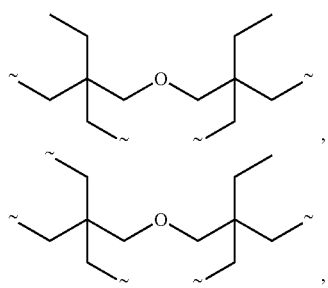

By way of example of a multifunctional acrylate derivative of formula (I) in which A represents a radical selected from the group cited in the above paragraph, mention may be made of those from Sigma-Aldrich: diethylene glycol diacrylate, dipropylene glycol diacrylate, dipentaerythritol pentaacrylate (DPPA), dipentaerythritol hexaacrylate (DPHA); those from Sartomer under the name ditrimethylolpropane tetraacrylate (SR355), dipentaerythritol pentaacrylate (SR399), pentaerythritol triacrylate (SR444), diethylene glycol dimethacrylate (SR231), those from Miwon Speciality Chemical under the name Miramer M340, M410, M500, M600, M231 or those from IGM Resins under the name Photomer 4306, 4600, 4666.

According to the invention, the multifunctional acrylate derivative of formula (I) is preferentially selected from the group consisting of dipentaerythritol penta(meth)acrylate, dipentaerythritol hexa(meth)acylate, diethylene glycol di(meth)acrylate, dipropylene glycol di(meth)acrylate, ethoxylated hexanediol di(meth)acrylate, propoxylated hexanediol di(meth)acrylate, ethoxylated trimethylpropane tri(meth)acrylate, propoxylated trimethylpropane tri(meth) acrylate, ethoxylated pentaerythritol tetra(meth)acrylate, propoxylated pentaerythritol tetra(meth)acrylate, ethoxylated bisphenol A di(meth)acrylate, propoxylated bisphenol A di(meth)acrylate, ethoxylated hexanediol glycol di(meth) acrylate, propoxylated hexanediol glycol di(meth)acrylate, ethoxylated neopentyl glycol di(meth)acrylate, propoxylated neopentyl glycol di(meth)acrylate, ethoxylated glyceryl tri(meth)acrylate, propoxylated glyceryl tri(meth)acrylate, ethoxylated trimethylolpropane tri(meth)acrylate, propoxylated trimethylolpropane tri(meth)acrylate, ester diol di(meth)acrylate, tri(2-hydroxyethyl) isocyanurate tri (meth)acrylate, hydroxypivalyl hydroxypivalate bis[6-(acryloyloxy)hexanoate] and mixtures thereof.

Preferably, the multifunctional acrylate derivative of formula (I) is selected from the group consisting of dipentaerythritol pentaacrylate, dipentaerythritol hexaacylate, diethylene glycol diacrylate, dipropylene glycol diacrylate, ethoxylated hexanediol diacrylate, propoxylated hexanediol diacrylate, ethoxylated trimethylolpropane triacrylate, propoxylated trimethylolpropane triacrylate, ethoxylated pentaerythritol tetraacrylate, propoxylated pentaerythritol tetraacrylate, ethoxylated bisphenol A diacrylate, propoxylated bisphenol A diacrylate, ethoxylated hexanediol glycol diacrylate, propoxylated hexanediol glycol diacrylate, ethoxylated neopentyl glycol diacrylate, propoxylated neopentyl glycol diacrylate, ethoxylated glyceryl triacrylate, propoxylated glyceryl triacrylate, ethoxylated trim ethylolpropane triacrylate, propoxylated trimethylolpropane triacrylate, ester diol diacrylate, tri(2-hydroxyethyl) isocyanurate triacrylate, hydroxypivalyl hydroxypivalate bis[6-(acryloyloxy)hexanoate] and mixtures thereof.

Preferably, the multifunctional acrylate derivative of formula (I) is preferentially selected from the group consisting of diethylene glycol diacrylate, dipropylene glycol diacrylate, ethoxylated hexanediol diacrylate, propoxylated hexanediol diacrylate, ethoxylated trimethylpropane triacrylate, propoxylated trimethylpropane triacrylate, ethoxylated pentaerythritol tetraacrylate, propoxylated pentaerythritol tetraacrylate, ethoxylated glyceryl triacrylate, propoxylated glyceryl triacrylate, ethoxylated trimethylolpropane triacrylate, propoxylated trimethylolpropane triacrylate, and mixtures thereof.

In the tyre composition according to the invention, the amount of polyfunctional acrylate derivative of formula (I), in the composition of the tyre according to the invention, is preferably within a range extending from 5 to 50 phr, preferably from 5 to 30 phr, preferably from more than 5 to 20 phr, preferably from more than 5 to 15 phr.

II-3 Peroxide

In addition to the elastomeric matrix and the polyfunctional acrylate described above, the rubber composition of the tyre of the invention uses a peroxide, which may be any peroxide known to those skilled in the art.

Among the peroxides, which are well known to those skilled in the art, it is preferable to use, for the invention, a peroxide selected from the family of the organic peroxides. Thus, advantageously, the peroxide is an organic peroxide.

The term "organic peroxide" is understood to mean an organic compound, that is to say a compound containing carbon, comprising an —O—O— group (two oxygen atoms connected by a covalent single bond).

Advantageously, the organic peroxide is selected from the group consisting of dialkyl peroxides, monoperoxycarbonates, diacyl peroxides, peroxyketals, peroxyesters and mixtures thereof.

Preferably, the dialkyl peroxides are selected from the group consisting of dicumyl peroxide, di(t-butyl) peroxide, t-butyl cumyl peroxide, 2,5-dimethyl-2,5-di(t-butylperoxy) hexane, 2,5-dimethyl-2,5-di(t-amylperoxy)hexane, 2,5-dimethyl-2,5-di(t-butylperoxy)hex-3-yne, 2,5-dimethyl-2,5-di(t-amylperoxy)hex-3-yne, α,α'-di[(t-butylperoxy)isopropyl] benzene, α,α'-di[(t-amylperoxy)isopropyl]benzene, di(t-amyl) peroxide, 1,3,5-tri[(t-butylperoxy)isopropyl]benzene, 1,3-dimethyl-3-(t-butylperoxy)butanol and 1,3-dimethyl-3-(t-amylperoxy)butanol and mixtures thereof.

Some monoperoxycarbonates, such as OO-tert-butyl O-(2-ethylhexyl) monoperoxycarbonate, OO-tert-butyl O-isopropyl monoperoxycarbonate, OO-tert-amyl O-(2-ethylhexyl) monoperoxycarbonate, and mixtures thereof, can also be used.

Among the diacyl peroxides, the preferred peroxide is benzoyl peroxide.

Among the peroxyketals, the preferred peroxides are selected from the group consisting of 1,1-di(t-butylperoxy)-3,3,5-trimethylcyclohexane, n-butyl 4,4-di(t-butyl peroxy) valerate, ethyl 3,3-di(t-butylperoxy)butyrate, 2,2-di(t-amylperoxy)propane, 3,6,9-triethyl-3,6,9-trimethyl-1,4,7-triperoxynonane (or methyl ethyl ketone peroxide cyclic trimer), 3,3,5,7,7-pentamethyl-1,2,4-trioxepane, n-butyl 4,4-bis(t-amylperoxy)valerate, ethyl 3,3-di(t-amylperoxy) butyrate, 1,1-di(t-butylperoxy)cyclohexane, 1,1-di(t-amylperoxy)cyclohexane and mixtures thereof.

Preferably, the peroxyesters are selected from the group consisting of tert-butyl peroxybenzoate, tert-butyl peroxy-2-ethylhexanoate, tert-butyl peroxy-3,5,5-trimethylhexanoate and mixtures thereof.

Preferably, the organic peroxide is selected from the group consisting of dicumyl peroxide, aryl or diaryl peroxides, diacetyl peroxide, benzoyl peroxide, dibenzoyl peroxide, di(tert-butyl) peroxide, tert-butyl cumyl peroxide, 2,5-bis(tert-butylperoxy)-2,5-dimethyl hexane, n-butyl 4,4'-di(tert-butylperoxy)valerate, OO-(t-butyl) 0-(2-ethylhexyl) monoperoxycarbonate, tert-butyl peroxyisopropyl carbonate, tert-butyl peroxybenzoate, tert-butyl peroxy-3,5,5-trimethylhexanoate, 1,3(4)-bis(tert-butylperoxyisopropyl)benzene and their, even more preferentially from the group consisting of dicumyl peroxide, n-butyl 4,4'-di(tert-butylperoxy)valerate, OO-(t-butyl) O-(2-ethylhexyl) monoperoxycarbonate, tert-butyl peroxyisopropyl carbonate, tert-butyl peroxybenzoate, tert-butyl peroxy-3,5,5-trimethylhexanoate, 1,3(4)-bis(tert-butylperoxyisopropyl)benzene and mixtures thereof.

In the tyre composition according to the invention, the amount of peroxide is preferably within a range extending from 0.1 to 10 phr. More preferentially, the amount of peroxide in the composition is within a range extending from 0.5 to 5 phr, preferably from 1 to 4 phr.

Various packaged products, known under their trade names, are available commercially; mention may be made of Dicup from Hercules Powder Co., Perkadox Y12 from Noury van der Lande, Peroximon F40 from Montecatini Edison S.p.A., Trigonox from Noury van der Lande, Varox from R.T.Vanderbilt Co. or also Luperko from Wallace & Tiernan Inc.

II-4 Reinforcing Filler

The composition of the tyre according to the invention does not require a reinforcing filler, which is one of its advantages since this makes it possible to greatly reduce the hysteresis of the composition, and thus the rolling resistance of the tyre.

Thus, preferably, the composition of the tyre according to the invention does not comprise a reinforcing filler or comprises less than 160 phr thereof.

Advantageously, the composition of the tyre can comprise from 5 to 120 phr, preferably from 5 to 65 phr, preferably from 5 to 60 phr, preferably from 10 to 55 phr, of reinforcing filler, known for its capacity to reinforce a rubber composition that can be used for the manufacture of tyres.

The reinforcing filler can be an organic filler such as carbon black, an inorganic filler such as silica or else a mixture of these two types of fillers.

All carbon blacks, in particular the blacks conventionally used in tyres or their treads, are suitable as carbon blacks. Among the latter, mention will more particularly be made of the reinforcing carbon blacks of the 100, 200 and 300 series, or the blacks of the 500, 600 or 700 series (ASTM D-1765-2017 grades), such as, for example, the N115, N134, N234, N326, N330, N339, N347, N375, N550, N683 and N772 blacks. These carbon blacks can be used in the isolated state, as available commercially, or in any other form, for example as support for some of the rubber additives used. The carbon blacks could, for example, already be incorporated into the diene elastomer, in particular isoprene elastomer, in the form of a masterbatch (see for example applications WO 97/36724-A2 or WO 99/16600-A1).

Mention may be made, as an example of organic fillers other than carbon blacks, of functionalized polyvinyl organic fillers, such as described in applications WO2006/069792-A1, WO2006/069793-A1, WO2008/003434-A1 and WO2008/003435-A1.

The term "reinforcing inorganic filler" should be understood here as meaning any inorganic or mineral filler, whatever its colour and its origin (natural or synthetic), also known as "white filler", "clear filler" or even "non-black filler", in contrast to carbon black, capable of reinforcing, by itself alone, without means other than an intermediate coupling agent, a rubber composition intended for the manufacture of tyres. In a known manner, certain reinforcing inorganic fillers can be characterized in particular by the presence of hydroxyl groups (—OH) on their surface.

Mineral fillers of the siliceous type, preferentially silica ($SiO_2$), or of the aluminous type, in particular alumina ($Al_2O_3$), are suitable in particular as reinforcing inorganic fillers. The silica used can be any reinforcing silica known to those skilled in the art, in particular any precipitated or fumed silica exhibiting a BET specific surface and a CTAB specific surface both of less than 450 $m^2/g$, preferably within a range extending from 30 to 400 $m^2/g$, in particular from 60 to 300 $m^2/g$.

For inorganic fillers such as silica for example, the BET specific surface area of the inorganic filler is determined by gas adsorption using the Brunauer-Emmett-Teller method described in "The Journal of the American Chemical Society", (Vol. 60, page 309, February 1938), and more specifically according to a method derived from the standard NF ISO 5794-1, appendix E, of June 2010 [multipoint (5 point) volumetric method—gas: nitrogen—degassing under vacuum: one hour at 160° C.—relative pressure range p/po: 0.05 to 0.17]. Moreover, the CTAB specific surface area values were determined according to the standard NF ISO 5794-1, appendix G of June 2010. The process is based on the adsorption of CTAB (N-hexadecyl-N,N,N-trimethylammonium bromide) onto the "outer" surface of the reinforcing filler.

Any type of precipitated silica can be used, in particular highly dispersible precipitated silicas (termed "HDS" for "highly dispersible" or "highly dispersible silica"). These precipitated silicas, which may or may not be highly dispersible, are well known to those skilled in the art. Mention may be made, for example, of the silicas described in applications WO 03/016215-A1 and WO 03/016387-A1. Among the commercial HDS silicas, it is possible in particular to use the silicas "Ultrasil® 5000GR", "Ultrasil® 7000GR" from Evonik, the silicas "Zeosil® 1085GR", "Zeosil® 1115 MP", "Zeosil® 1165MP", "Zeosil® Premium 200MP", "Zeosil® HRS 1200 MP" from Solvay. As non-HDS silica, the following commercial silicas can be used: "Ultrasil® VN2GR" silicas, "Ultrasil® VN3GR" from Evonik, the silica "Zeosil® 175GR" from Solvay, the silicas "Hi-Sil EZ120G(-D)", "Hi-Sil EZ160G(-D)", "Hi-Sil EZ200G(-D)", "Hi-Sil 243LD", "Hi-Sil 210", "Hi-Sil HDP 320G" from PPG.

As other examples of inorganic fillers that can be used in the rubber compositions of the invention, mention may also be made of mineral fillers of the aluminous type, in particular alumina ($Al_2O_3$), aluminium oxides, aluminium hydroxides, aluminosilicates, titanium oxides, silicon carbides or nitrides, all of the reinforcing type as described for example in applications WO 99/28376-A2, WO 00/73372-A1, WO 02/053634-A1, WO2004/003067-A1, WO2004/056915-A2, U.S. Pat. No. 6,610,261-61 and U.S. Pat. No. 6,747,087-B2. Mention may in particular be made of the aluminas "Baikalox A125" or "CR125" (Baïkowski company), "APA-100RDX" (Condéa), "Aluminoxid C" (Evonik) or "AKP-G015" (Sumitomo Chemicals).

The physical state in which the reinforcing inorganic filler is provided is not important, whether it is in the form of a powder, of microbeads, of granules, or else of beads or any other appropriate densified form. Of course, reinforcing inorganic filler is also understood to mean mixtures of different reinforcing inorganic fillers, in particular of silicas as described above.

Those skilled in the art will understand that, instead of the reinforcing inorganic filler described above, a reinforcing filler of another nature could be used, as long as this reinforcing filler of another nature is covered with an inorganic layer such as silica, or else would comprise functional sites, in particular hydroxyls, at its surface, requiring the use of a coupling agent to establish the bond between this reinforcing filler and the diene elastomer. By way of example, mention may be made of carbon blacks partially or fully covered with silica, or carbon blacks modified with silica, such as, without limitation, the fillers of the "Ecoblack®" type of the "CRX2000" series or of the "CRX4000" series from Cabot Corporation.

In order to couple the reinforcing inorganic filler to the diene elastomer, use may be made, in a well-known way, of an at least bifunctional coupling agent (or bonding agent) intended to provide a satisfactory connection, of chemical and/or physical nature, between the inorganic filler (surface of its particles) and the diene elastomer. Use is made in particular of organosilanes or polyorganosiloxanes which are at least bifunctional. The term "bifunctional" is understood to mean a compound having a first functional group capable of interacting with the inorganic filler and a second functional group capable of interacting with the diene elastomer. For example, such a bifunctional compound can comprise a first functional group comprising a silicon atom, said first functional group being able to interact with the hydroxyl groups of an inorganic filler and a second functional group comprising a sulfur atom, said second functional group being able to interact with the diene elastomer.

Preferably, the organosilanes are selected from the group consisting of organosilane polysulfides (symmetrical or asymmetrical) such as bis(3-triethoxysilylpropyl) tetrasulfide, abbreviated to TESPT sold under the name "Si69" by Evonik or bis(triethoxysilylpropyl)disulfide, abbreviated to TESPD sold under the name "Si75" by Evonik, polyorganosiloxanes, mercaptosilanes, blocked mercaptosilanes, such as S-(3-(triethoxysilyl)propyl) octanethioate sold by Momentive under the name "NXT Silane". More preferentially, the organosilane is an organosilane polysulfide.

Of course, use might also be made of mixtures of the coupling agents described above.

When an inorganic filler is used, the content of coupling agent in the composition of the tyre according to the invention is advantageously less than or equal to 10 phr, it being understood that it is generally desirable to use as little as possible thereof. Typically, the content of coupling agent represents from 0.5% to 15% by weight, with respect to the amount of reinforcing inorganic filler. Its content is preferably within a range extending from 0.5 to 7.5 phr, more preferentially within a range extending from 3 to 3 phr. This content is easily adjusted by those skilled in the art according to the content of reinforcing inorganic filler used in the composition of the invention.

Preferably, the reinforcing filler of the rubber composition of the tyre according to the invention comprises a carbon black, a silica or a mixture thereof. Even more preferentially, the reinforcing filler comprises predominantly carbon black. The reinforcing filler can comprise, for example, from 50% to 100% by weight of carbon black, preferably from 55% to 90% by weight, preferably from 60% to 80% by weight. Particularly advantageously, the reinforcing filler comprises exclusively carbon black.

Advantageously, the content of reinforcing filler, preferably the reinforcing filler mainly comprising carbon black, in the composition of the tyre according to the invention, is within a range extending from 10 to 55 phr, preferably from 15 to 50 phr, preferably 20 to 45 phr.

II-5 Vulcanization System

The composition of the tyre according to the invention does not require a vulcanization system, which is one of its advantages since this makes it possible to simplify the formulation, and the preparation of the composition. If, however, a vulcanization system is present in the composition, it is preferably present in small amounts.

The vulcanization system proper is generally based on sulfur (or on a sulfur-donating agent) and on a primary vulcanization accelerator. Various known secondary vulcanization accelerators or vulcanization activators, such as zinc oxide, stearic acid or equivalent compounds, or guanidine derivatives (in particular diphenylguanidine), are added to this base vulcanization system, being incorporated during the non-productive first phase and/or during the productive phase, as described subsequently.

Molecular sulfur (or equivalently molecular sulfur-donating agents), when it is used, is in a content preferentially of less than 0.5 phr.

Thus, very preferentially, the composition does not contain molecular sulfur or sulfur-donating agent as vulcanizing agent or contains less than 0.5 phr, preferably less than 0.3 phr, more preferably less than 0.1 phr thereof. More preferably, the composition of the tyre according to the invention does not contain molecular sulfur or sulfur-donating agent as vulcanizing agent.

The vulcanization system of the composition according to the invention can also comprise one or more additional accelerators, for example compounds of the family of the thiurams, zinc dithiocarbamate derivatives, sulfenamides, guanidines or thiophosphates. Use may be made in particular of any compound that is capable of acting as accelerator of the vulcanization of diene elastomers in the presence of sulfur, notably accelerators of the thiazole type and derivatives thereof, and accelerators of thiuram or zinc dithiocarbamate type. These accelerators are more preferably selected from the group consisting of 2-mercaptobenzothiazole disulfide (abbreviated to "MBTS"), N-cyclohexyl-2-benzothiazolesulfenamide (abbreviated to "CBS"), N,N-dicyclohexyl-2-benzothiazolesulfenamide (abbreviated to "DCBS"), N-(tert-butyl)-2-benzothiazolesulfenamide (abbreviated to "TBBS"), N-(tert-butyl)-2-benzothiazolesulfenimide (abbreviated to "TBSI"), zinc dibenzyldithiocarbamate (abbreviated to "ZBEC") and mixtures of these compounds. Preferably, use is made of a primary accelerator of the sulfenamide type.

If an accelerator is used, it is used at contents such as those used by those skilled in the art of vulcanized compositions for tyres. Nevertheless, the composition of the tyre according to the invention is preferentially devoid of any vulcanization accelerator.

II-6 Other Possible Additives

The rubber compositions of the tyre according to the invention may optionally also comprise all or some of the usual additives customarily used in elastomer compositions for tyres, such as for example plasticizers (such as plasticizing oils and/or plasticizing resins), pigments, protective agents such as anti-ozone waxes, chemical anti-ozonants, antioxidants, anti-fatigue agents, reinforcing resins (as described for example in application WO 02/10269).

Preferably, the composition of the tyre of the invention is devoid of antioxidant.

According to one preferential mode, the composition of the tyre of the invention is devoid of plasticizing agent. Alternatively and according to an also preferential embodiment, the composition according to the invention also comprises a plasticizing agent. Preferably, this plasticizing agent is a solid hydrocarbon resin (or plasticizing resin), an extender oil (or plasticizing oil) or a mixture of the two.

II-7 Tyres

A subject of the present invention is also a finished or semi-finished rubber article, as well as a tyre, comprising a composition according to the present invention.

The invention relates in particular to tyres intended to equip motor vehicles of passenger vehicle type, SUVs ("Sport Utility Vehicles"), or two-wheel vehicles (notably motorcycles), or aircraft, or else industrial vehicles selected from vans, heavy-duty vehicles, i.e. underground trains, buses, heavy road transport vehicles (lorries, tractors, trailers) or off-road vehicles, such as heavy agricultural vehicles or construction vehicles, and the like.

It is possible to define, within the tyre, three types of regions:
- The radially exterior region in contact with the ambient air, this region essentially consisting of the tread and of the outer sidewall of the tyre. An outer sidewall is an elastomeric layer positioned outside the carcass reinforcement relative to the inner cavity of the tyre, between the crown and the bead, so as to completely or partially cover the region of the carcass reinforcement extending from the crown to the bead.
- The radially interior region in contact with the inflation gas, this region generally consisting of the layer airtight to the inflation gases, sometimes known as interior airtight layer or inner liner.
- The internal region of the tyre, that is to say that between the exterior and interior regions. This region includes layers or plies which are referred to here as internal layers of the tyre. These are, for example, carcass plies, tread sublayers, tyre belt plies or any other layer which is not in contact with the ambient air or the inflation gas of the tyre.

The composition defined in the present description is particularly well suited to the internal layers and to the treads of tyres.

Thus, in the tyre according to the present invention, the composition may be present in the tread and/or at least one internal layer of the tyre. According to the invention, the internal layer can be selected from the group consisting of carcass plies, crown plies, bead-wire fillings, crown feet, decoupling layers, edge rubbers, padding rubbers, the tread underlayer and the combinations of these internal layers. Preferably, the internal layer is selected from the group consisting of carcass plies, crown plies, bead-wire fillings, crown feet, decoupling layers and combinations of these internal layers.

The invention relates to the tyres and semi-finished products for tyres described above, articles made of rubber, both in the raw state (that is to say, before curing) and in the cured state (that is to say, after crosslinking or vulcanization).

II-8 Preparation of the Rubber Compositions

The rubber composition in accordance with the invention is manufactured in appropriate mixers using two successive preparation phases well known to those skilled in the art:
- a first phase of thermomechanical working or kneading ("non-productive" phase), which can be carried out in a single thermomechanical step during which all the necessary constituents, in particular the elastomeric matrix, the optional fillers and the optional other various additives, with the exception of the crosslinking system, are introduced into an appropriate mixer, such as a standard internal mixer (for example of 'Banbury' type). The incorporation of the optional filler into the elastomer may be performed in one or more portions while thermomechanically kneading. The non-productive phase can be carried out at high temperature, up to a maximum temperature of between 110° C. and 200° C., preferably between 130° C. and 185° C., for a period of time generally of between 2 and 10 minutes.

a second phase of mechanical working ("productive" phase), which is carried out in an external mixer, such as an open mill, after cooling the mixture obtained during the first non-productive phase down to a lower temperature, typically of less than 120° C., for example between 40° C. and 100° C. The crosslinking system is then incorporated and the combined mixture is then mixed for a few minutes, for example between 5 and 15 min.

Such phases have been described, for example, in patent applications EP-A-0501227, EP-A-0735088, EP-A-0810258, WO 00/05300 or WO 00/05301.

The final composition thus obtained is subsequently calendered, for example in the form of a sheet or of a plaque, in particular for a laboratory characterization, or also extruded in the form of a rubber semi-finished (or profiled) element which can be used, for example, as a tyre tread or an internal layer for a passenger vehicle. These products can subsequently be used for the manufacture of tyres, according to techniques known to those skilled in the art.

The composition may be either in the raw state (before crosslinking or vulcanization) or in the cured state (after crosslinking or vulcanization), may be a semi-finished product which can be used in a tyre.

The crosslinking of the composition can be carried out in a way known to those skilled in the art, for example at a temperature of between 130° C. and 200° C., under pressure.

III—EXAMPLES

III-1 Measurements and Tests Used

Determination of the Molar Masses: Size Exclusion Chromatography Analysis of the Copolymers a) For the copolymers which are soluble in tetrahydrofuran (THF) at ambient temperature, the molar masses were determined by size exclusion chromatography in THF. The samples were injected using a Waters 717 injector and a Waters 515 HPLC pump at a flow rate of 1 ml·min$^{-1}$ in a series of Polymer Laboratories columns. This series of columns, placed in a thermostated chamber at 45° C., is composed of:
1 PL Gel 5 µm precolumn,
2 PL Gel 5 µm Mixte C columns,
1 PL Gel 5 µm-500 Å column.

The detection was carried out using a Waters 410 refractometer. The molar masses were determined by universal calibration using polystyrene standards certified by Polymer Laboratories and a double detection with refractometer and coupling to the viscometer.

Without being an absolute method, SEC makes it possible to comprehend the distribution of the molecular weights of a polymer. On the basis of standard commercial products of polystyrene type, the various number-average weights (Mn) and weight-average weights (Mw) can be determined and the polydispersity index calculated (PDI=Mw/Mn).

b) For the copolymers which are insoluble in tetrahydrofuran at ambient temperature, the molar masses were determined in 1,2,4-trichlorobenzene. They were first dissolved under hot conditions (4 h 00 at 150° C.), then they were injected at 150° C., with a flow rate of 1 ml·min$^{-1}$, into a Waters Alliance GPCV 2000 chromatograph equipped with three Styragel columns (2 HT6E columns and 1 HT2 column). The detection was carried out using a Waters refractometer. The molar masses were determined by relative calibration using polystyrene standards certified by Polymer Laboratories.

Determination of the Mole Fractions

Reference is made to the article "Investigation of ethylene/butadiene copolymers microstructure by $^1$H and $^{13}$C NMR, Llauro M. F., Monnet C., Barbotin F., Monteil V., Spitz R., Boisson C., Macromolecules 2001, 34, 6304-6311", for a detailed description of the $^1$H NMR and $^{13}$C NMR techniques which have been specifically used in the present application to determine the mole fractions of the ethylene units, the conjugated diene units and of any trans-1,2-cyclohexane units.

Determination of the Crystallinity

The crystallinity measurement was carried out by comparison of the enthalpy of fusion observed in the case of EBRs. This endothermic phenomenon is observed during the analysis of the thermogram of the DSC (Differential Scanning Calorimetry) measurement. The measurement is carried out by back-and-forth scanning from −150° C. to 200° C. under an inert (helium) atmosphere with a gradient of 20° C./min.

The signal corresponding to the endothermic (fusion) phenomenon is integrated and the degree of crystallinity is the ratio of the enthalpy measured to that of the perfectly crystalline polyethylene (290 J/g).

% Crystallinity=(Enthalpy measured in J/g)/(theoretical enthalpy of a 100% crystalline polyethylene in J/g).

Determination of the Glass Transition Temperature

The glass transition temperature, Tg, is measured in the present application by the DSC (Differential Scanning Calorimetry) technique on a Setaram DSC 131 apparatus. The temperature programme used corresponds to a temperature increase from −120° C. to 150° C. at a rate of 10° C./min. Reference may be made to the method described in application WO 2007/054224 (page 11).

Dynamic Properties (after Curing): Tensile Test

These tensile tests make it possible to determine the elasticity stresses and the properties at break. Unless otherwise indicated, they are carried out in accordance with French Standard NF T 46-002 of September 1988. Processing the tensile recordings also makes it possible to plot the curve of modulus as a function of the elongation. The modulus used here is the nominal (or apparent) secant modulus measured in first elongation, calculated by reducing to the initial cross section of the test specimen. The nominal secant moduli (or apparent stresses, in MPa) are measured in first elongation at 50%, 100% and 300% elongation, respectively denoted M50, M100 and M300.

The tests for elongation at break (% EB) and stress at break (SB) are based on the standard NF ISO 37 from December 2005 on a dumbbell-shaped test specimen of H2 type and are measured at a pull speed of 500 mm/min. The elongation at break is expressed as % elongation. The stress at break is expressed in MPa.

All these tensile measurements are carried out under the standard conditions of temperature (23±2° C.) and hygrometry (50±5% relative humidity), according to French Standard NF T 40-101 (December 1979).

The dynamic properties G*(10%), G*(25%) and tan(δ) max at 60° C. are measured on a viscosity analyser (Metravib VA4000), according to Standard ASTM D 5992-96. The response of a sample of crosslinked composition (cylindrical test specimen with a thickness of 4 mm and a cross section of 400 mm², subjected to a simple alternating sinusoidal shear stress, at a frequency of 10 Hz, under the defined conditions of temperature, for example at 60° C., according to Standard ASTM D 1349-99 or, as the case may be, at a different temperature, is recorded. A strain amplitude sweep is carried out from 0.1% to 50% (outward cycle) and then from 50% to 1% (return cycle). The results made use of are the complex dynamic shear modulus G* and the loss factor tan(δ). The maximum value of tan(δ) observed, denoted tan(δ)max, and the complex dynamic shear modulus G* at 10% or 25% strain, at 60° C., are shown for the return cycle.

Rheometry

The measurements are carried out at a given temperature (for example 140° C.) with an oscillating disc rheometer, according to Standard DIN 53529-Part 3 (June 1983). The change in the rheometric torque, ΔTorque, as a function of the time describes the change in the stiffening of the composition as a result of the vulcanization reaction. The measurements are processed according to Standard DIN 53529-Part 2 (March 1983): tα is the induction period (expressed in min), that is to say the time necessary for the start of the crosslinking reaction; ta (for example t95) is the time necessary to achieve a conversion of α % (for example 95%), that is to say α % (for example 95%) of the difference between the minimum and maximum torques. The lower the value of tα, the more the composition will have rapidly crosslinked, that is to say that the curing will have been rapid.

III-2 Preparation of the Compositions

The tests which follow are carried out in the following way: the elastomer, the reinforcing filler, the polyfunctional acrylate and also the various other ingredients, with the exception of the crosslinking system, are successively introduced into a blade mixer (final degree of filling: approximately 70% by volume), the initial vessel temperature of which is approximately 90° C. Thermomechanical working (non-productive phase) is then carried out in one step, which lasts in total approximately from 3 to 4 min, until a maximum "dropping" temperature of 150° C. is reached.

The mixture thus obtained is recovered and cooled and then the crosslinking system (peroxide or sulfur as appropriate) is incorporated, on a mixer (homo-finisher) at 23° C. or 50° C., respectively, by mixing the whole (productive phase) in a cylinder tool for a suitable period of time (for example between 5 and 12 min).

The compositions thus obtained are subsequently calendered, either in the form of slabs (thickness of 2 to 3 mm) or of thin sheets of rubber for the measurement of their physical or mechanical properties, or extruded in the form of a profiled element.

III-3 Tests on Rubber Compositions

III-3.1 Effect of the Nature of the Crosslinking System

The examples were carried out in order to compare in particular the effect of acrylate derivatives in accordance with the invention (composition C₁) to a control composition (T1) which differs from the compositions in accordance with the invention by virtue of the nature of the crosslinking system, and a control composition (T2) which differs from the compositions in accordance with the invention only by the absence of acrylate derivative, and also to a control composition (T3) which differs only by virtue of the nature of the polyfunctional acrylate derivative. These rubber compositions were prepared as indicated in point III-2 above. The formulations thereof (in phr) and the properties thereof have been summarized in Table 1 below.

In the compositions T3 and C₁, the amount of polyfunctional acrylate derivative has been adjusted so that the compositions have a constant molar content of (meth)acrylate functional group.

The results for G*25% at 60° C., M300 and tan(δ)max are presented in "base 100" relative to the control composition T1. For the G*25% at 60° C. and M300 values, the higher the value, the more the result is improved. Moreover, the lower the value of tan(δ)max at 60° C. base 100, the lower the hysteresis of the composition will be and thus the more its rolling resistance will be improved.

TABLE 1

|  | T1 | T2 | T3 | C1 |
| --- | --- | --- | --- | --- |
| EBR (1) | 100 | 100 | 100 | 100 |
| N234 (2) | 40 | 40 | 40 | 40 |
| Peroxide (3) | — | 4 | 4 | 4 |
| HDDA (4) | — | — | 10.2 | — |
| DPPA (5) | — | — | — | 10.5 |
| Sulfur | 1 | — | — | — |
| CBS (6) | 1 | — | — | — |
| ZnO (7) | 2.5 | — | — | — |
| Stearic acid (8) | 1 | — | — | — |
| t95 at 140° C. (min) | 55 | 23 | 29 | 22 |
| G*25% at 60° C. | 100 | 122 | 124 | 150 |
| Tan(δ) max 60° C. | 100 | 95 | 74 | 79 |
| M300 | 100 | 85 | 253 | 308 |

(1) Ethylene-butadiene copolymer with 80 mol % of ethylene units prepared according to a process for the polymerization of ethylene and butadiene according to Example 4-2 of patent EP 1 954 705 B1 in the name of the Applicants, the polymerization time being adjusted so as to obtain a molar mass Mn = 153 000 g/mol with a polydispersity index equal to 1.9
(2) Carbon black N234 (name according to Standard ASTM D-1765)
(3) 1,1-Bis(t-butylperoxy)-3,3,5-trimethylcyclohexane (Luperox 231 from Arkema)
(4) Hexanediol diacrylate (SR238 from Sigma-Aldrich)
(5) Dipentaerythritol pentaacrylate (SR399 from Sigma-Aldrich)
(6) N-Cyclohexyl-2-benzothiazolesulfenamide (Santocure CBS from Flexsys)
(7) Zinc oxide (industrial grade - Umicore)
(8) Stearin (Pristerene 4931 from Uniqema)

These results show that the replacement of a conventional vulcanization system by a crosslinking system based on peroxide and an acrylate derivative in accordance with the invention makes it possible to accelerate the rate of crosslinking, to increase stiffness and to improve the reinforcement of the composition, while improving rolling resistance.

III-3.2 Effective the Nature of the Elastomeric Matrix

Other examples were carried out in order to compare the effect of the replacement of an elastomeric matrix based on natural rubber and on polybutadiene by a copolymer comprising ethylene units and conjugated diene units.

A control composition T4 was thus prepared as indicated in point III-2 above in order to compare it with the composition in accordance with the invention (C₁) above. Their formulations (in phr) and their properties have been summarized in Table 2 below.

The results for CR and G*25% at 60° C. are presented in "base 100" relative to the control composition T4. The higher the value, the better the result.

TABLE 2

|  | T4 | C1 |
| --- | --- | --- |
| NR (8) | 75 | — |
| BR (9) | 25 | — |
| EBR (1) | — | 100 |
| N234 (2) | 40 | 40 |
| Peroxide (3) | 4 | 4 |
| DPPA (4) | — | 10.5 |

TABLE 2-continued

|  | T4 | C1 |
| --- | --- | --- |
| CR | 100 | 168 |
| G*25% at 60° C. | 100 | 162 |

(1) to (4): see Table 1 above
(8) Natural rubber
(9) Polybutadiene (Nd) with 0.7% of 1,2; 1.7% of trans 1,4; 98% of cis 1,4 (Tg = −105° C.) (Buna CB24 from Arlanxeo)

These results show that the use of acrylate derivatives in accordance with the invention, in an elastomeric matrix based on a copolymer comprising ethylene units and conjugated diene units, and a peroxide-based crosslinking system, makes it possible to improve the mechanical properties and stiffness compared to a composition comprising a conventional elastomeric matrix.

The invention claimed is:

1. A tire comprising a rubber composition based on:
an elastomeric matrix comprising predominantly a random copolymer comprising ethylene units and conjugated diene units, the mole fraction of the ethylene units in the copolymer being within a range extending from 50% to 95%;
at least one peroxide; and
at least one polyfunctional acrylate derivative of formula (I):

$$[X]_p A \quad (I)$$

in which:
A represents a linear, branched or cyclic $C_4$-$C_{30}$ hydrocarbon group, interrupted and/or substituted by one or more heteroatoms, A comprising p free valences, p having a value ranging from 2 to 6, and [X]p corresponds to a radical of formula (II):

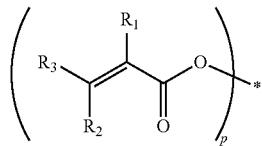

in which
$R_1$, $R_2$ and $R_3$ independently represent a hydrogen atom or a $C_1$-$C_8$ hydrocarbon group selected from the group consisting of linear, branched or cyclic alkyl groups, alkylaryl groups, aryl groups and aralkyls, and which are optionally interrupted by one or more heteroatoms, it being possible for $R_2$ and $R_3$ together to form a non-aromatic ring, and
(*) represents the point of attachment of the radical of formula (II) to A, it being understood that the 2 to 6× radicals are identical or different.

2. The tire according to claim 1, wherein the conjugated diene units are selected from the group consisting of butadiene units, isoprene units and mixtures thereof.

3. The tire according to claim 1, wherein the mole fraction of the ethylene units in the random copolymer comprising ethylene units and conjugated diene units is within a range extending from 60% to 90%.

4. The tire according to claim 1, wherein $R_1$, $R_2$ and $R_3$ each represent a hydrogen atom.

5. The tire according to claim 1, wherein the heteroatom(s) of A are selected from the group consisting of oxygen, sulfur, nitrogen, silicon and phosphorus atoms, and combinations thereof.

6. The tire according to claim 1, wherein A represents a linear, branched or cyclic $C_4$-$C_{30}$ hydrocarbon group, interrupted and/or substituted by one or more oxygen and/or sulfur atoms.

7. The tire according to claim 1, wherein A represents a linear, branched or cyclic $C_4$-$C_{30}$ hydrocarbon group, interrupted by one or more oxygen and/or sulfur atoms.

8. The tire according to claim 1, wherein the at least one polyfunctional acrylate derivative of formula (I) is selected from the group consisting of dipentaerythritol penta(meth)acrylate, dipentaerythritol hexa(meth)acrylate, diethylene glycol di(meth)acrylate, dipropylene glycol di(meth)acrylate, ethoxylated hexanediol di(meth)acrylate, propoxylated hexanediol di(meth)acrylate, ethoxylated trimethylpropane tri(meth)acrylate, propoxylated trimethylpropane tri(meth)acrylate, ethoxylated pentaerythritol tetra(meth)acrylate, propoxylated pentaerythritol tetra(meth)acrylate, ethoxylated bisphenol A di(meth)acrylate, propoxylated bisphenol A di(meth)acrylate, ethoxylated hexanediol glycol di(meth)acrylate glycol, propoxylated hexanediol glycol di(meth)acrylate, ethoxylated neopentyl glycol di(meth)acrylate, propoxylated neopentyl glycol di(meth)acrylate, ethoxylated glyceryl tri(meth)acrylate, propoxylated glyceryl tri(meth)acrylate, ethoxylated trimethylolpropane tri(meth)acrylate, propoxylated trimethylolpropane tri(meth)acrylate, ester diol di(meth)acrylate, tri(2-hydroxyethyl) isocyanurate tri(meth)acrylate, hydroxypivalyl hydroxypivalate bis[6-(acryloyloxy)hexanoate, and mixtures thereof.

9. The tire according to claim 1, wherein the amount of the at least one polyfunctional acrylate derivative of formula (I) in the rubber composition is within a range extending from 5 to 50 parts by weight per hundred parts by weight of elastomer, phr.

10. The tire according to claim 1, wherein the at least one peroxide in the rubber composition is an organic peroxide.

11. The tire according to claim 1, wherein the amount of the at least one peroxide in the rubber composition is within a range extending from 0.1 to 10 phr.

12. The tire according to claim 1, wherein the rubber composition comprises from 5 to 65 phr of reinforcing filler.

13. The tire according to claim 12, wherein the reinforcing filler comprises a carbon black, a silica, or a mixture thereof.

14. The tire according to claim 12, wherein the reinforcing filler mainly comprises carbon black.

15. The tire according to claim 1, wherein the rubber composition is present in the tread, in at least one internal layer, or in both the tread and at least one internal layer of the tire.

16. The tire according to claim 15, wherein the at least one internal layer is selected from the group consisting of carcass plies, crown plies, bead-wire fillings, crown feet, decoupling layers, edge rubbers, padding rubbers, the tread underlayer and combinations thereof.

* * * * *